(12) United States Patent
Kapila

(10) Patent No.: US 11,292,972 B2
(45) Date of Patent: Apr. 5, 2022

(54) PIPELINE INTEGRATION OIL RECOVERY

(71) Applicant: Halliburton Energy Services, Inc., Houston, TX (US)

(72) Inventor: Rajesh C. Kapila, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/954,110

(22) PCT Filed: Jul. 11, 2019

(86) PCT No.: PCT/US2019/041445
§ 371 (c)(1),
(2) Date: Jun. 15, 2020

(87) PCT Pub. No.: WO2021/006913
PCT Pub. Date: Jan. 14, 2021

(65) Prior Publication Data
US 2021/0324277 A1    Oct. 21, 2021

(51) Int. Cl.
*C10G 53/02*    (2006.01)
*B01D 3/14*    (2006.01)
(Continued)

(52) U.S. Cl.
CPC ............ *C10G 53/02* (2013.01); *B01D 3/148* (2013.01); *B01D 5/006* (2013.01); *B01D 5/0027* (2013.01);
(Continued)

(58) Field of Classification Search
USPC ......... 585/240; 210/713; 208/347, 357, 364, 208/366, 368; 196/98, 114, 747.1
See application file for complete search history.

(56) References Cited

U.S. PATENT DOCUMENTS 5,269,906 A * 12/1993 Reynolds ............... B01D 17/00
208/13
6,042,718 A * 3/2000 Bland .................... C10G 31/08
203/14

(Continued)

FOREIGN PATENT DOCUMENTS

CN        203330114        12/2013

OTHER PUBLICATIONS

ISRWO International Search Report and Written Opinion for PCT/US2019/041445 dated Apr. 10, 2020.
(Continued)

*Primary Examiner* — Nina Bhat
(74) *Attorney, Agent, or Firm* — Tenley Krueger; C. Tumey Law Group PLLC

(57) ABSTRACT

A method may include: heating a hydrocarbon contaminated waste in a first heating unit, vaporizing at least a portion of water and hydrocarbons in the hydrocarbon contaminated waste and generating: a first vaporized stream and a first bottoms stream, heating the first bottoms stream in a second heating unit; vaporizing at least a portion of hydrocarbons in the first bottoms stream and generating: a second vaporized stream and a second bottoms stream, condensing the first vaporized stream to form a first condensed stream; and condensing the second vaporized stream to form a second condensed stream.

20 Claims, 2 Drawing Sheets

(51) Int. Cl.
    *B01D 5/00*          (2006.01)
    *B01D 17/02*       (2006.01)
    *B01D 45/16*       (2006.01)

(52) U.S. Cl.
    CPC ......... *B01D 5/0081* (2013.01); *B01D 5/0084* (2013.01); *B01D 17/02* (2013.01); *B01D 45/16* (2013.01); *C10G 2300/1003* (2013.01); *C10G 2300/4012* (2013.01)

(56) References Cited

U.S. PATENT DOCUMENTS

| | | | | |
|---|---|---|---|---|
| 7,913,776 | B2* | 3/2011 | Nahmad | E21B 21/066 |
| | | | | 175/66 |
| 11,060,365 | B2* | 7/2021 | Kapila | B01F 3/12 |
| 2003/0228196 | A1 | 12/2003 | Stachwell et al. | |
| 2006/0076275 | A1* | 4/2006 | Smith | C10G 1/02 |
| | | | | 208/408 |
| 2009/0223858 | A1* | 9/2009 | Nahmad | B01D 17/047 |
| | | | | 208/13 |
| 2011/0203968 | A1 | 8/2011 | Scheirs | |
| 2013/0168291 | A1* | 7/2013 | Recatto | C10G 1/02 |
| | | | | 208/187 |
| 2014/0238681 | A1* | 8/2014 | Trygstad | C10G 9/36 |
| | | | | 166/303 |
| 2015/0338162 | A1* | 11/2015 | Hoffman | F26B 17/20 |
| | | | | 34/429 |
| 2015/0345273 | A1* | 12/2015 | Ayapbergenov | C02F 1/04 |
| | | | | 203/22 |
| 2017/0182431 | A1* | 6/2017 | Gupta | B01D 1/28 |
| 2017/0298703 | A1* | 10/2017 | Ross | F26B 3/18 |
| 2018/0023006 | A1* | 1/2018 | Lembcke | B01D 61/145 |
| | | | | 208/390 |

OTHER PUBLICATIONS

RLC Technologies, Inc., Separation and Recovery of Oil From Oily Waste Materials Using Anaerobic Thermal Desrotpion Unit Technology.

* cited by examiner

PIPELINE INTEGRATION OIL RECOVERY

BACKGROUND

During oil exploration, production, refining, and chemical processing, waste streams may be generated that are contaminated with oil and other hydrocarbons. Such waste streams may have little value in the process they are being used in and thus may be disposed of in waste pits or other containment vessels for later processing. In some regions, legacy waste pits and containment vessels may exist that have been dormant for years or decades without being processed. Waste pits, whether old or new, may pose environmental risks as the oil and other hydrocarbons present therein are often noxious to plants and animals. The release of the waste into the environment may cause harm to the plants and animals exposed to the waste. There may be solutions to disposal of waste streams including disposing in a disposal well and reprocessing, for example. Reprocessing generally involves separating components of the waste into more valuable streams which may then be used in further downstream processes. However, the reprocessing also may generate additional waste streams which may themselves be noxious and have even less value than the starting waste materials. Additionally, current treatment methods may be unable to process contaminated materials with high solids content and produce a separate clean water stream, clean oil stream, and clean solid streams without high-cost chemistry and separations by centrifugation, for example.

BRIEF DESCRIPTION OF THE DRAWINGS

These drawings illustrate certain aspects of some of the present disclosure and should not be used to limit or define the disclosure.

DETAILED DESCRIPTION

This disclosure may relate to methods and processes for recovering oils and/or water from hydrocarbon contaminated solids and generate a pipeline oil feed. Hydrocarbon contaminated solids may include any solids contaminated with hydrocarbons such as, without limitation, drilling cuttings, soils, disposal pit wastes, and other solids associated with hydrocarbon exploration, refining, and hydrocarbon chemical processing. Solids may be in particulate form and may sometimes be referred to herein as particulate or particulates. The process described herein may treat industry waste contaminated with hydrocarbons to directly form a sales crude oil. The waste may contain any volume of solids content including about 0.01% by volume solids to about 99.99% by volume solids.

Some examples described herein may include using a thermal desorption process performed under vacuum to treat hydrocarbon contaminated waste. Thermal desorption may include introducing the hydrocarbon contaminated waste into a vessel, heating the solid-laden invert emulsion drilling fluid in the vessel, and removing a vapor stream including at least a portion of hydrocarbons and water, if present, from the hydrocarbon contaminated waste. The heat may be provided from any source, including, but not limited to, a direct fired heater, an indirect fired heater, thermo-mechanical heating such as by a thermal screw, electric resistance heater or any other suitable heating method. In some examples, the presence water and hydrocarbons under vacuum (i.e. less than atmospheric pressure) may allow for the processing temperature to be less than the atmospheric boiling point of the various hydrocarbons (i.e., the boiling point of the hydrocarbons at atmospheric pressure). The lower operating temperature in addition to limiting the amount of oxygen in the systems may, in some instances, provide for mitigation of hydrocarbon cracking and degradation. The vapor stream including hydrocarbons and water may be condensed and processed to produce a saleable pipeline oil.

Figure 1:
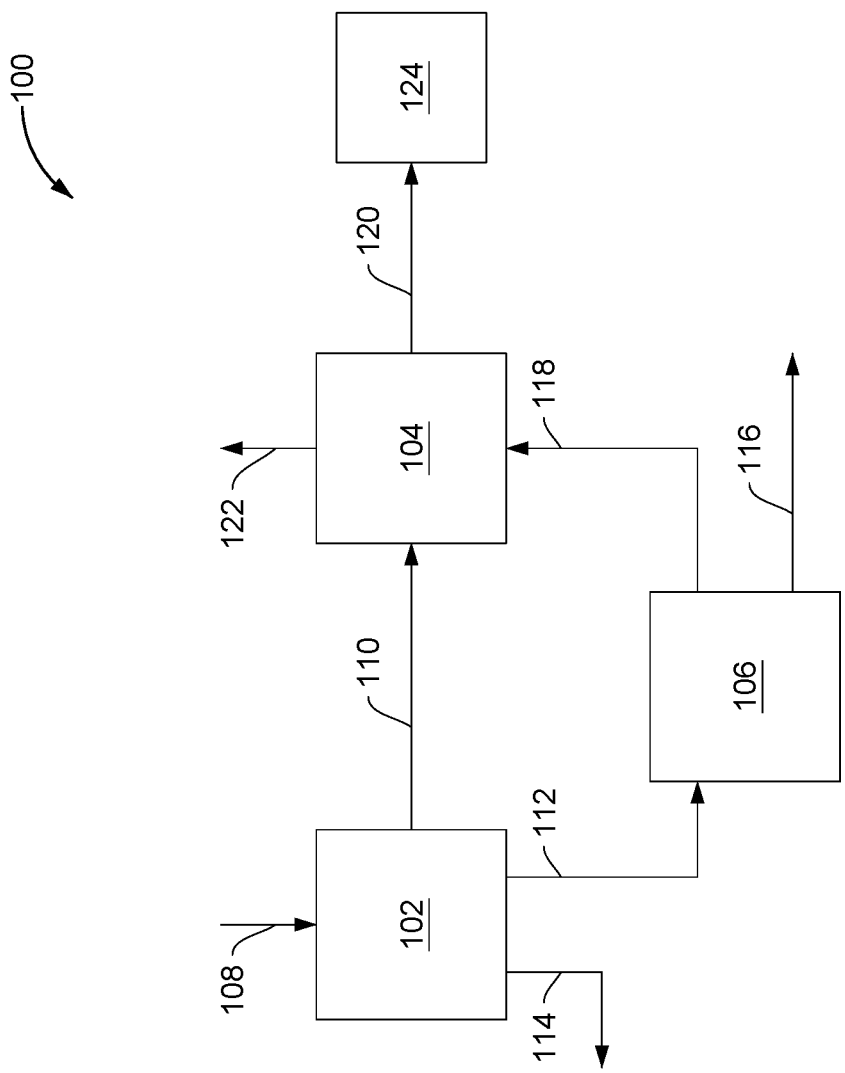
FIG. 1 illustrates a process for recovering oil from hydrocarbon contaminated solids.

FIG. 1 illustrates a process 100 for recovering oil from hydrocarbon contaminated solids 108. Hydrocarbon contaminated solids 108 may be introduced into oil-water separation unit 102 which may generate recovered oil stream 110, recovered water stream 114, and oil sludge stream 112. Oil-water separation unit 102 may include various equipment configured to generate the streams described above including conveyance mechanisms, mixers, hoppers, heating units, and oil/water separators, for example. The oil-water separation unit 102 may remove a majority of water and oil present in hydrocarbon contaminated solids 108 and remove substantially all of the solids content of in hydrocarbon contaminated solids 108. As used herein, substantially all of the solids content means greater than 95% by weight of the solids are removed. In some examples, greater than 99% by weight of the solids are removed. Oil sludge stream 112 may contain substantially all of the solids content of hydrocarbon contaminated solids 108 with only minor amounts, or none, of solids from hydrocarbon contaminated solids 108 being present in recovered oil stream 110 and recovered water stream 114.

Oil sludge stream 112 may be further conveyed to solids recovery unit 106 whereby remaining hydrocarbons in oil sludge stream 112 may be recovered to generate a solids waste stream 116 and a recovered gaseous hydrocarbon stream 118. Solids recovery unit 106 may include various equipment configured to remove hydrocarbons from the solids portion of oil sludge stream 112 and recover substantially all of the vaporizable hydrocarbons present in oil sludge stream 112 as recovered gaseous hydrocarbon stream 118. Solids waste stream 116 may contain substantially all asphaltenes and tars present in oil sludge stream 112 and may be substantially free of vaporizable hydrocarbons. Solids waste stream 116 may contain heavy hydrocarbons useful in reclaimed applications such as road construction. Solids waste stream 116 may also be disposed of as solids waste according to local guidelines or be further processed if the solids waste contains other contaminants that may not be removed from the solids waste by the solids recovery unit 106. Some examples of additional contaminants may include heavy metals such as chromium, cadmium, mercury, lead, and zinc, for example.

Recovered oil stream 110 and recovered gaseous hydrocarbon stream 118 may be conveyed to oil recovery unit 104 for further processing. In oil recovery unit 104, the hydrocarbons in recovered oil stream 110 and recovered gaseous hydrocarbon stream 118 may be converted to syngas stream 122 and pipeline oil stream 120. Oil recovery unit 104 may include various equipment to convey hydrocarbons, convert hydrocarbons to syngas, refine hydrocarbons, recover energy, produce energy required during the operation of process 100. Pipeline oil stream 120 may contain substantially all of the hydrocarbons from hydrocarbon contaminated solids 108 which have characteristics of crude oil such that the pipeline oil stream 120 may be introduced into pipeline 124.

Figure 2:
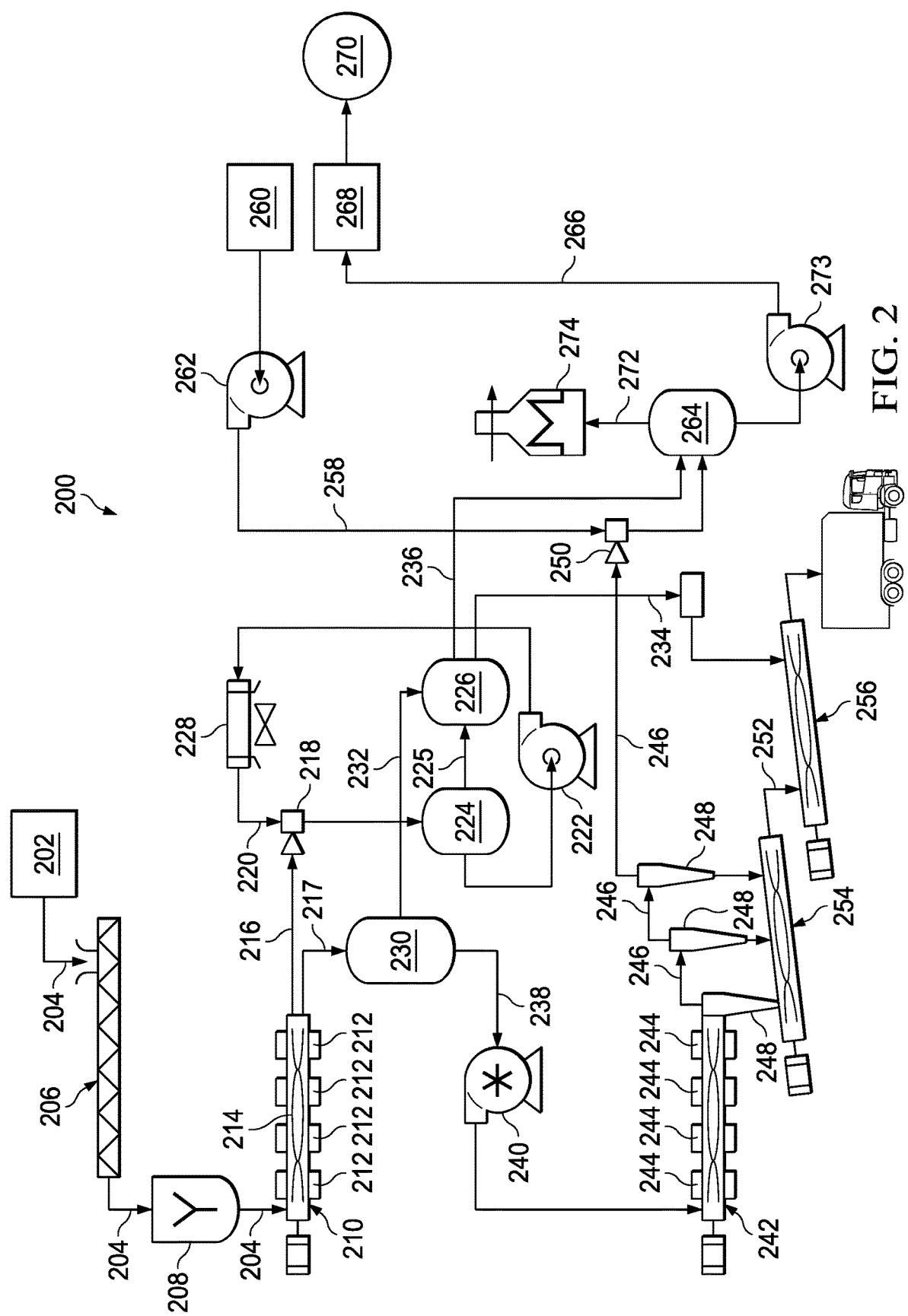
FIG. 2 illustrates a process for recovering crude oil from hydrocarbon contaminated waste.

FIG. 2 illustrates a process 200 for recovering a saleable crude oil from hydrocarbon contaminated wastes. Process 200 may start by providing a hydrocarbon contaminated waste source 202. Hydrocarbon contaminated waste source 202 may be any source of hydrocarbon contaminated solids such as crude oil contaminated waste from crude oil refineries, waste pits, and other sources of hydrocarbon contaminated solids. For some hydrocarbon contaminated waste sources such as soil-lined waste pits, soil may be dug up to be processed alongside other solids present in the soil-lined waste pit. From hydrocarbon contaminated waste source 202, hydrocarbon contaminated waste stream 204 may be conveyed using conveyance 206 to storage unit 208. Hydrocarbon contaminated waste stream 204 may include solids contaminated with one or more natural or synthetic hydrocarbon such as, without limitation, diesel, kerosene, fuel oil, crude oil, mineral oil, an alkane, an olefin, an aromatic organic compound, a cyclic alkane, a paraffin, and synthetic oils such as alpha-olefins and esters, for example. Hydrocarbon contaminated waste stream 204 may further include water which may be emulsified with the hydrocarbons present in hydrocarbon contaminated waste stream 204. Crude oils may contain natural emulsifiers such that at least a portion of water present in hydrocarbon contaminated waste stream 204 may be emulsified in a hydrocarbon phase.

Storage unit 208 may include conveyance means, hoppers, tanks, and mixers, for example, which may be configured to store hydrocarbon contaminated waste stream 204 until processing may be completed. Storage unit 208 may mix the hydrocarbon contaminated waste stream 204 before conveying to low temperature separation unit 210. Low temperature separation unit 210 may be configured to heat hydrocarbon contaminated waste stream 204 such that any water present in the hydrocarbon contaminated waste stream 204 is removed as vapor stream 216. Low temperature separation unit 210 may include a body or vessel otherwise capable of containing the hydrocarbon contaminated waste. Conveyance 214 may be disposed within low temperature separation unit 210 and move the hydrocarbon contaminated waste though the body or vessel of low temperature separation unit 210. Conveyance 214 may include screws, for example, that convey and mix hydrocarbon contaminated waste stream 204 through a length of low temperature separation unit 210. Conveying and mixing hydrocarbon contaminated waste stream 204 may allow for more uniform heat distribution within low temperature separation unit 210.

Low temperature separation unit 210 may be heated by one or more heating units 212. Heating units 212 may be any kind of heating units such as electric heaters or fired heaters which may operate at any temperature. Heating units 212 may be in thermal communication with the body or vessel of low temperature separation unit 210. A control system may be provided (not shown) that may regulate the operating temperature of heating units 212 such that a temperature within a body portion of low temperature separation unit 210 where hydrocarbon contaminated waste stream 204 is being conveyed through is kept within an operational window. As hydrocarbon contaminated waste stream 204 traverses a length of low temperature separation unit 210, hydrocarbon contaminated waste stream 204 may be heated to the point where water present in hydrocarbon contaminated waste stream 204 may begin to vaporize. Additionally, hydrocarbons with relatively low boiling points may also vaporize alongside the water. The combination water/hydrocarbon vapor may leave low temperature separation unit 210 as vapor stream 216.

Low temperature separation unit 210 may be operated at any temperature suitable for generating vapor stream 216. For example, low temperature separation unit 210 be operated at a temperature at a point in a range of about 100° C. to about 250° C. Alternatively, low temperature separation unit 210 may be operated at a temperature at a point in a range of about 100° C. to about 120° C., about 120° C. to about 140° C., about 140° C. to about 160° C., about 160° C. to about 180° C., about 180° C. to about 200° C., about 200° C. to about 220° C., about 220° C. to about 240° C., or about 240° C. to about 250° C. Low temperature separation unit 210 may be operated at any temperature suitable for generating vapor stream 216. For example, low temperature separation unit 210 may operate at a pressure less than atmospheric pressure (101.325 kPa) including at a pressure at a point in a range of about 1 kPa to about 94 kPa. Alternatively, low temperature separation unit 210 may operate at a pressure at a point in a range of about 1 kPa to about 10 kPa, at a point in a range of about 10 kPa to about 20 kPa, at a point in a range of about 20 kPa to about 30 kPa, at a point in a range of about 30 kPa to about 40 kPa, at a point in a range of about 40 kPa to about 50 kPa, at a point in a range of about 50 kPa to about 60 kPa, at a point in a range of about 60 kPa to about 70 kPa, at a point in a range of about 70 kPa to about 80 kPa, or at a point in a range of about 80 kPa to about 94 kPa. In a particular example, low temperature separation unit 210 may operate at a pressure at a point in a range of about 30 kPa to about 70 kPa.

Vapor stream 216 may be drawn into eductor 218 and be contacted with stream 220 thereby causing vapor stream 216 to at least partially condense and be incorporated into the bulk liquid phase of stream 220. Stream 220 may be a mixture of oil and water and may be a stream generated by the condensing of vapor stream 216. As discussed above, low temperature separation unit 210 operates at a pressure below atmospheric. The reduced pressure in low temperature separation unit 210 is provided by a vacuum generated from eductor 218. Eductor 218 may be considered a jet pump that is able to transfer energy from one fluid to another via the Venturi effect. The structure of eductor 218 may be such that stream 220 from pump 222 flowing into eductor 218 causes a pressure drop within eductor 218. Stream 220 may be considered the motive fluid which causes eductor 218 to be operable to cause the pressure drop. The first motive fluid may include air, water, steam, or a combination thereof. The pressure drop within eductor 218 causes a pressure drop in equipment upstream of eductor 218, including within low temperature separation unit 210. In general, a relatively higher volumetric flow rate provided by pump 222 will result in a relatively higher pressure drop within eductor 218 which in turn results in a lower the pressure within low temperature separation unit 210. Thus, the operating pressure of low temperature separation unit 210 may be controlled by adjusting a volumetric flow rate of pump 222, for example.

From low temperature separation unit 210, the components of hydrocarbon contaminated waste stream 204 which are not vaporized in low temperature separation unit 210 may be conveyed to heated settling unit 230 in stream 217. Stream 217 may include solids and liquids which are not vaporizable at the operating pressure and temperature of temperature separation unit 210 and vaporizable components that did not vaporize in low temperature separation unit 210. Heated settling unit 230 may heat contents of stream 217 to further separate components therein. Heated settling unit 230 may operate at a temperature and pressure such that hydrocarbons and water may desorb from solids present in stream 217 which may be decanted or otherwise separated as reclaimed steam 232 and conveyed to oil-water separator 226. From eductor 218, the condensed portion of vapor stream 216 and stream 220 may flow into surge tank 224. Pump 222 may pump from surge tank 224 to heat exchanger 228 which may cool stream 220 before introduction into eductor 218. From surge tank 224, an overflow steam 225 may be conveyed to oil-water separator 226. Oil-water separator 226 may separate oil from water to produce reclaimed water stream 234 and reclaimed oil stream 236. Reclaimed water stream 234 may be substantially free of oil and reclaimed oil stream 236 may be substantially free of water. The degree of oil-water separation may depend on the residence time of the oil-water separation process which may be selected to suit a particular application. In some examples, the oil-water separator may produce reclaimed oil stream 236 with greater than 70% oil by volume, greater than 80% oil by volume, greater than 90% oil by volume, greater than 95% oil by volume, or greater than 99% oil by volume.

Bottoms stream 238 from heated settling unit 230 may be pumped using pump 240 to high temperature separation unit 242. High temperature separation unit 242 may include a body or vessel capable of containing contents of bottoms stream 238 and may be heated by one or more heating units 244 in thermal communication with the body or vessel. Heating units 244 may be any kind of heating units such as electric heaters or fired heaters which may operate at any temperature. A control system may be provided (not shown) that may regulate the operating temperature of heating units 244 such that a temperature within a body portion of high temperature separation unit 242 where components of bottoms stream 238 are being conveyed through is kept within an operational window. As bottoms stream 238 is introduced into high temperature separation unit 242, the heat supplied by the heating unit 244 may increase the temperature of materials within high temperature separation unit 242 thereby causing at least a portion of the hydrocarbons present in to vaporize to form vapor stream 246. Furthermore, the operating temperature of high temperature separation unit 242 may be such that thermal degradation of hydrocarbons may begin to occur to form relatively lighter hydrocarbons such as methane, ethane, and for example. The thermal degradation gas species may collect into vapor stream 246 alongside vaporized hydrocarbon species. In some examples, high temperature separation unit 242 may be configured to remove substantially all of the hydrocarbons that will vaporize at the operating temperature and pressure of high temperature separation unit 242. As high temperature separation unit 242 is operated under vacuum, the boiling point of hydrocarbons may be lower than the boiling point at normal atmospheric pressure of 101.235 kPa. The operating conditions of high temperature separation unit 242 may allow a greater fraction of hydrocarbons to vaporize as compared to if high temperature separation unit 242 were operated at or near atmospheric pressure. The remaining hydrocarbons, if any, may be long chain hydrocarbons, tars, and asphaltenes as well as coke.

The vaporized hydrocarbons well as any remaining solids and liquids may be conveyed to one or more cyclones 248. Cyclones 248 may separate solids entrained in the vaporized hydrocarbon to produce vapor stream 246 and bottoms stream 252. Bottoms stream 252 may include solids from bottoms stream 238 and remaining hydrocarbons not vaporized in high temperature separation unit 242. Solids separated from one or more cyclones 248 may be deposited into conveyance 254 and further into conveyance 256. Bottoms stream 252 may optionally be rehydrated with reclaimed water from reclaimed water stream 234 to reduce dust. Bottoms stream 252 may include materials that may be useful in reclaimed materials applications such as roofing and road construction, for example.

High temperature separation unit 242 may be operated at any temperature suitable for generating vapor stream 246. For example, high temperature separation unit 424 be operated at a temperature at a point in a range of about 300° C. to about 500° C. Alternatively, high temperature separation unit 242 may be operated at a temperature at a point in a range of about 300° C. to about 350° C., at a point in a range of about 350° C. to about 400° C., at a point in a range of about 400° C. to about 450° C., or at a point in a range of about 450° C. to about 500° C.

High temperature separation unit 242 may be operated at any temperature suitable for generating vapor stream 246. For example, high temperature separation unit 242 may operate at a pressure less than atmospheric pressure (101.325 kPa) including at a pressure at a point in a range of about 1 kPa to about 94 kPa. Alternatively, high temperature separation unit 242 may operate at a pressure at a point in a range of about 1 kPa to about 10 kPa, at a point in a range of about 10 kPa to about 20 kPa, at a point in a range of about 20 kPa to about 30 kPa, at a point in a range of about 30 kPa to about 40 kPa, at a point in a range of about 40 kPa to about 50 kPa, at a point in a range of about 50 kPa to about 60 kPa, at a point in a range of about 60 kPa to about 70 kPa, at a point in a range of about 70 kPa to about 80 kPa, or at a point in a range of about 80 kPa to about 94 kPa. In a particular example, high temperature separation unit 242 may operate at a pressure at a point in a range of about 30 kPa to about 70 kPa.

Vapor stream 246 may be drawn into eductor 250 and be contacted with crude oil stream 258 thereby causing vapor stream 246 to at least partially condense and be incorporated into the bulk liquid phase of crude oil stream 258. Crude oil stream 258 may be pumped from crude oil storage 260 by pump 262. Eductor 250 may operate by the same principle as eductor 218 but using crude oil as the motive fluid. The pressure drop in eductor 250 may cause a pressure drop in equipment upstream of eductor 250 including high temperature separation unit 242. In general, a relatively higher the volumetric flow rate provided by pump 262 will result in a relatively higher pressure drop within eductor 250 which in turn results in a lower the pressure within high temperature separation unit 242. Thus, the operating pressure of high temperature separation unit 242 may be controlled by adjusting a volumetric flow rate of pump 262, for example.

Crude oil stream 258 containing crude and condensed hydrocarbons from vapor stream 246 and reclaimed oil stream 236 may be conveyed to crude oil tank 264 where a non-condensable hydrocarbon stream 272 may be removed. The non-condensable hydrocarbon stream 272 may include hydrocarbons that are not normally condensable without cryogenics including methane, ethane, and propane, for example. Syn gas recovery unit 274 may take non-condensable hydrocarbon stream 272 and convert at least a portion of the contents to syngas via the water gas shirt reaction, for example. Alternatively, components of a non-condensable hydrocarbon stream 272 may be separated further such as by distillation, reacted to form products, or burned for fuel. Pipeline oil stream 266 may be drawn from crude oil tank 264 by pump 273 and be conveyed to crude oil storage 268 and further on to pipeline 270.

Oil recovery unit 104 may include various equipment to convey hydrocarbons, convert hydrocarbons to syngas, refine hydrocarbons, recover energy, and produce energy required during the operation of process 200. Pipeline oil stream 266 may contain substantially all of the hydrocarbons from hydrocarbon contaminated waste stream 204 which are vaporizable at the operating conditions of low temperature separation unit 210 and high temperature separation unit 242. Pipeline oil stream 266 may be a saleable crude oil product that can be introduced into pipeline 270 without further refinement.

Accordingly, the present disclosure may provide methods, systems, and apparatus that may relate to recovering oils and/or water from hydrocarbon contaminated solids and generate a pipeline oil feed. The methods, systems, and apparatus may include any of the various features disclosed herein, including one or more of the following statements.

Statement 1. A method comprising: heating a hydrocarbon contaminated waste in a first heating unit, wherein the hydrocarbon contaminated waste comprises hydrocarbons, particulates, and water; vaporizing at least a portion of the water and the hydrocarbons in the hydrocarbon contaminated waste at a pressure less than 101.325 kPa to generate: a first vaporized stream comprising vaporized water and vaporized hydrocarbons from the hydrocarbon contaminated waste; and a first bottoms stream comprising at least a portion of the particulates and a portion of hydrocarbons not vaporized; heating the first bottoms stream in a second heating unit; vaporizing at least a portion of the hydrocarbons in the first bottoms stream at a pressure less than 101.325 kPa to generate: a second vaporized stream comprising the at least the portion of the vaporized hydrocarbons from the first bottoms stream; and a second bottoms stream comprising the particulates and portion of hydrocarbons not vaporized from the first bottoms stream; condensing the first vaporized stream to form a first condensed stream; and condensing the second vaporized stream to form a second condensed stream.

Statement 2. The method of statement 1 wherein the step of vaporizing at least a portion of the water and the hydrocarbons in the hydrocarbon contaminated waste is performed at a temperature of about 100° C. to about 250° C.

Statement 3. The method of any of statements 1-2 wherein the step of vaporizing at least a portion of the water and the hydrocarbons in the hydrocarbon contaminated waste is performed at a pressure of about 1 kPa to about 94 kPa.

Statement 4. The method of any of statements 1-3 wherein the step of vaporizing at least a portion of the hydrocarbons in the first bottoms stream is performed at a temperature of about 100° C. to about 250° C.

Statement 5. The method of any of statements 1-4 The method of claim 1 wherein the step of vaporizing at least a portion of the hydrocarbons in the first bottoms stream is performed at a pressure of about 1 kPa to about 94 kPa.

Statement 6. The method of any of statements 1-5 further comprising: pumping a first motive fluid into a first eductor and generating a pressure drop within the first eductor thereby causing the first vaporized stream to be drawn into the first eductor; and contacting the first motive fluid with the first vaporized stream in the first eductor, thereby causing at least a portion of the first vaporized stream to condense to form the first condensed stream.

Statement 7. The method of statement 6 wherein the first motive fluid comprises at least one fluid selected from the group consisting of air, steam, water, and combinations thereof.

Statement 8. The method of any of statements 1-7 further comprising: pumping a crude oil into a second eductor and generating a pressure drop within the second eductor thereby causing the second vaporized stream to be drawn into the second eductor; and contacting the crude oil with the second vaporized stream in the second eductor, thereby causing at least a portion of the second vaporized stream to condense to form the second condensed stream.

Statement 9. The method of any of statements 1-8 further comprising: separating a hydrocarbon stream and an aqueous stream from the first condensed stream.

Statement 10. The method of statement 9 further comprising: combining the second condensed stream and the hydrocarbon stream to form a reclaimed oil stream; and introducing the reclaimed oil stream into a pipeline.

Statement 11. A method comprising: heating a hydrocarbon contaminated waste in a first heating unit; vaporizing at least a portion of the hydrocarbon contaminated waste to generate: a first vaporized stream; and a first bottoms stream; heating the first bottoms stream in a second heating unit; vaporizing at least a portion of the first bottoms stream to generate: a second vaporized stream; and a second bottoms stream; condensing the first vaporized stream to form a first condensed stream; and condensing the second vaporized stream to form a second condensed stream.

Statement 12. The method of statement 11 further comprising pumping a motive fluid into an eductor and generating a pressure drop within the eductor thereby causing the first vaporized stream to be drawn into the eductor; and contacting the motive fluid with the first vaporized stream in the eductor, thereby causing at least a portion of the first vaporized stream to condense to form the first condensed stream.

Statement 13. The method of statement 11 further comprising pumping a motive fluid into an eductor and generating a pressure drop within the eductor thereby causing the second vaporized stream to be drawn into the eductor; and contacting the motive fluid with the second vaporized stream in the eductor, thereby causing at least a portion of the second vaporized stream to condense to form the second condensed stream.

Statement 14. The method of statement 13 further comprising introducing the second vaporized stream into at least one cyclone prior to the step of introducing contacting the motive fluid with the second vaporized stream in the eductor.

Statement 15. The method of any of statements 11-14 further comprising introducing the first condensed stream into an oil-water separator and generating an output stream from the oil-water separator.

Statement 16. The method of claim 14 further comprising combining the output stream from the oil-water separator with the second condensed stream.

Statement 17. A system comprising: a first heating unit comprising: a first vessel at least one heater in thermal communication with the first vessel; and a conveyance disposed within the first vessel; a first eductor fluidically coupled to a vapor outlet of the first heating unit and a first motive fluid stream; a second heating unit comprising: a second vessel; at least one heater in thermal communication with the second vessel; and a conveyance disposed within the second vessel; wherein an inlet of the second heating unit is fluidically coupled to a bottoms stream of the first heating unit; and a second eductor fluidically coupled to an outlet of the second heating unit and a crude oil stream.

Statement 18. The system of statement 17 further comprising an oil-water separator fluidically coupled to an outlet of the first eductor.

Statement 19. The system of any of statements 17-18 further comprising at least one cyclone disposed between the outlet of the second heating unit and the second eductor, the at least one cyclone being fluidically coupled to the outlet of the second heating unit and an inlet of the second eductor.

Statement 20. The system of any of statements 17-19 further comprising a tank fluidically coupled to an outlet of the first eductor and an outlet of the second eductor.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method comprising:
   heating a hydrocarbon contaminated waste in a first heating unit, wherein the hydrocarbon contaminated waste comprises hydrocarbons, particulates, and water;
   vaporizing at least a portion of the water and the hydrocarbons in the hydrocarbon contaminated waste at a pressure less than 101.325 kPa to generate:
      a first vaporized stream comprising vaporized water and vaporized hydrocarbons from the hydrocarbon contaminated waste; and
      a first bottoms stream comprising at least a portion of the particulates and a portion of hydrocarbons not vaporized;
   heating the first bottoms stream in a second heating unit;
   vaporizing at least a portion of the hydrocarbons in the first bottoms stream at a pressure less than 101.325 kPa to generate:
      a second vaporized stream comprising the at least the portion of the vaporized hydrocarbons from the first bottoms stream; and
      a second bottoms stream comprising the particulates and portion of hydrocarbons not vaporized from the first bottoms stream;
   condensing the first vaporized stream to form a first condensed stream; and
   condensing the second vaporized stream to form a second condensed stream.

2. The method of claim 1 wherein the step of vaporizing at least a portion of the water and the hydrocarbons in the hydrocarbon contaminated waste is performed at a temperature of about 100° C. to about 250° C.

3. The method of claim 1 wherein the step of vaporizing at least a portion of the water and the hydrocarbons in the hydrocarbon contaminated waste is performed at a pressure of about 1 kPa to about 94 kPa.

4. The method of claim 1 wherein the step of vaporizing at least a portion of the hydrocarbons in the first bottoms stream is performed at a temperature of about 100° C. to about 250° C.

5. The method of claim 1 wherein the step of vaporizing at least a portion of the hydrocarbons in the first bottoms stream is performed at a pressure of about 1 kPa to about 94 kPa.

6. The method of claim 1 further comprising:
   pumping a first motive fluid into a first eductor and generating a pressure drop within the first eductor thereby causing the first vaporized stream to be drawn into the first eductor; and contacting the first motive fluid with the first vaporized stream in the first eductor, thereby causing at least a portion of the first vaporized stream to condense to form the first condensed stream.

7. The method of claim 6 wherein the first motive fluid comprises at least one fluid selected from the group consisting of air, steam, water, and combinations thereof.

8. The method of claim 1 further comprising:
pumping a crude oil into a second eductor and generating a pressure drop within the second eductor thereby causing the second vaporized stream to be drawn into the second eductor; and
contacting the crude oil with the second vaporized stream in the second eductor, thereby causing at least a portion of the second vaporized stream to condense to form the second condensed stream.

9. The method of claim 1 further comprising:
separating a hydrocarbon stream and an aqueous stream from the first condensed stream.

10. The method of claim 9 further comprising:
combining the second condensed stream and the hydrocarbon stream to form a reclaimed oil stream; and
introducing the reclaimed oil stream into a pipeline.

11. A method comprising:
heating a hydrocarbon contaminated waste in a first heating unit;
vaporizing at least a portion of the hydrocarbon contaminated waste to generate:
a first vaporized stream; and
a first bottoms stream;
heating the first bottoms stream in a second heating unit;
vaporizing at least a portion of the first bottoms stream to generate:
a second vaporized stream; and
a second bottoms stream;
condensing the first vaporized stream to form a first condensed stream; and
condensing the second vaporized stream to form a second condensed stream.

12. The method of claim 11 further comprising pumping a motive fluid into an eductor and generating a pressure drop within the eductor thereby causing the first vaporized stream to be drawn into the eductor; and
contacting the motive fluid with the first vaporized stream in the eductor, thereby causing at least a portion of the first vaporized stream to condense to form the first condensed stream.

13. The method of claim 11 further comprising pumping a motive fluid into an eductor and generating a pressure drop within the eductor thereby causing the second vaporized stream to be drawn into the eductor; and
contacting the motive fluid with the second vaporized stream in the eductor, thereby causing at least a portion of the second vaporized stream to condense to form the second condensed stream.

14. The method of claim 13 further comprising introducing the second vaporized stream into at least one cyclone prior to the step of introducing contacting the motive fluid with the second vaporized stream in the eductor.

15. The method of claim 11 further comprising introducing the first condensed stream into an oil-water separator and generating an output stream from the oil-water separator.

16. The method of claim 14 further comprising combining the output stream from the oil-water separator with the second condensed stream.

17. A system comprising:
a first heating unit comprising:
a first vessel;
at least one heater in thermal communication with the first vessel; and
a conveyance disposed within the first vessel;
a first eductor fluidically coupled to a vapor outlet of the first heating unit and a first motive fluid stream;
a second heating unit comprising:
a second vessel;
at least one heater in thermal communication with the second vessel; and
a conveyance disposed within the second vessel;
wherein an inlet of the second heating unit is fluidically coupled to a bottoms stream of the first heating unit; and
a second eductor fluidically coupled to an outlet of the second heating unit and a crude oil stream.

18. The system of claim 17 further comprising an oil-water separator fluidically coupled to an outlet of the first eductor.

19. The system of claim 17 further comprising at least one cyclone disposed between the outlet of the second heating unit and the second eductor, the at least one cyclone being fluidically coupled to the outlet of the second heating unit and an inlet of the second eductor.

20. The system of claim 17 further comprising a tank fluidically coupled to an outlet of the first eductor and an outlet of the second eductor.

* * * * *